Figure 1:
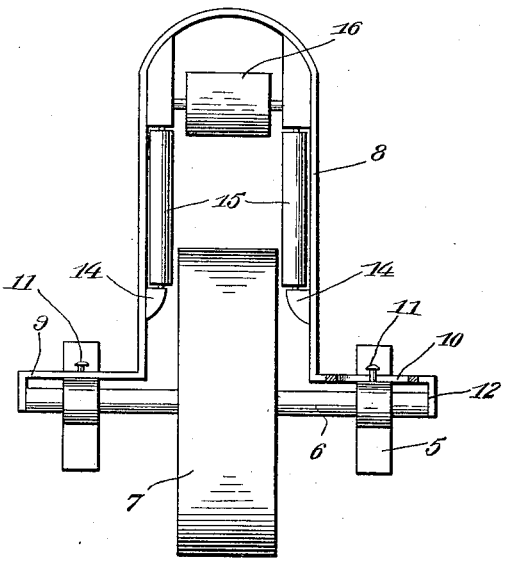

W. ELLIS.
BELT GUIDE.
APPLICATION FILED MAY 13, 1911.

1,007,650.

Patented Oct. 31, 1911.

Witnesses
J. H. Crawford
D. W. Gould

Inventor
Wesley Ellis,
By Victor J. Evans
Attorney

COLUMBIA PLANOGRAPH CO., WASHINGTON, D. C.

UNITED STATES PATENT OFFICE.

WESLEY ELLIS, OF HARROD, OHIO.

BELT-GUIDE.

1,007,650.

Specification of Letters Patent. Patented Oct. 31, 1911.

Application filed May 13, 1911. Serial No. 626,907.

*To all whom it may concern:*

Be it known that I, WESLEY ELLIS, a citizen of the United States, residing at Harrod, in the county of Allen and State of Ohio, have invented new and useful Improvements in Belt-Guides, of which the following is a specification.

This invention relates to belt guides, and the object of the same is to provide a frame for guarding the belt or cable from slipping off a pulley or sheave and so mounted upon the bearings that it will move laterally with the pulley. This object is accomplished by the construction hereinafter more fully described and claimed and as shown in the drawings wherein—

Figure 2:
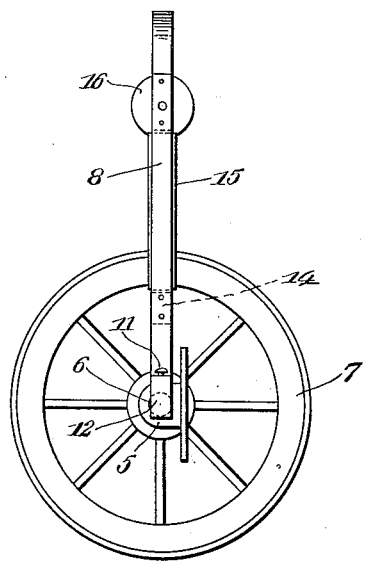

Figure 1 is a plan view of the bearings supporting a pulley and its shaft, showing my improved cable guard as mounted upon the bearings. Fig. 2 is an end view of the device.

In the drawings the numeral 5 designates bearings of any suitable type within which is mounted the shaft of a pulley 7 which latter is keyed to and therefore rotates with said shaft 6, the latter being mounted to rotate within and move longitudinally through the bearings in any well known manner.

The guard may be of stout wire or of strap iron and of dimensions proportionate to the size of the sheave. It comprises a frame 8 bent into U-shape, legs 9 projecting straight outward from the ends of said frame and having slots 10 loosely engaging screws 11 which are mounted in the bearings 5. Hooks or feet 12 are formed at the outer ends of said legs 9 and engage the extremities of the shaft 6, so that as the latter is shifted longitudinally through the bearings the feet cause the frame to move with it. In blocks 14 within the frame are journaled the trunnions of two side pulleys or rollers 15 whose inner ends extend a little inward past the edge of the sheave 7, and one cross roller 16 whose inner edge extends inward slightly beyond the outer ends of the side rollers 15 as best seen in Fig. 1. Hence there is formed a rectangular space bounded on the inside by the periphery of the sheave, on the two sides by the rollers 15, and on the outer side by the cross roller 16; and through this space passes the belt or cable not shown.

In Fig. 1 I have shown the belt guide mounted vertically upon the shaft, this being its position if the belt operates horizontally and extends around behind the sheave; or it will be clear that if the belt runs downward from the sheave the frame must project outwardly from the latter, or wherever the belt runs on the sheave that is the side that the frame must cover. Obviously the belt or cable passes over the periphery of the sheave and normally between and out of contact with any of the rollers 15 or 16, but when the cable seeks to jump off the sheave it strikes one of said rollers and is immediately restored to its position on the periphery of the sheave where it belongs.

This device is especially adapted to those pulleys or sheaves whose shafts not only rotate within their bearings but also move longitudinally through them as is sometimes the case, and the slots 10 within the legs of the frame permit the latter to move over the screws 11 as will be clear. Yet I do not intend that the innermost blocks 14 within the frame shall contact with the sides of the sheave, because the feet 12 at the outer ends of the legs 9 of the frame contacting with the extremities of the shaft 6, perform the function of moving the entire frame bodily as the shaft moves longitudinally through its bearings.

The parts may be of the desired sizes, shapes, proportions and materials, and much change in detail may be adopted without departing from the principle of my invention.

What is claimed as new is:

1. The combination with two bearings, a sheave between them, and a shaft fixed in the sheave and journaled in the bearings for longitudinal motion therein; of a U-shaped frame whose body surrounds said sheave loosely and whose arms have outwardly projecting slotted legs passing over said bearings and feet contacting with the extremities of said shaft, and screws rising from said bearings and loosely engaging said slots.

2. The combination with two bearings, a sheave between them, and a shaft fixed in the sheave and journaled in the bearings for longitudinal motion therein; of a U-shaped frame whose body surrounds said sheave loosely and whose arms have outwardly projecting slotted legs passing over said bearings and feet contacting with the extremities of said shaft, screws rising from said bearings and loosely engaging said slots, blocks within the frame, and cable-guiding rollers having their trunnions journaled in said blocks.

3. The combination of a longitudinally movable shaft and its bearings, of a pulley mounted on the shaft, a belt on said pulley, and a guide for said belt, said guide inclosing the belt and pulley and being longitudinally movable with the said shaft.

4. The combination with a shaft and its bearing, of a belt pulley mounted on the shaft, a belt guide mounted on the bearings, said shaft being movable longitudinally in the bearings, and means formed on said guide to move the same on movement of the shaft.

5. The combination with the shaft and its bearings, of a pulley mounted on the shaft, said shaft being movable longitudinally in the bearings, a belt guide supported upon the bearings, said guide including a U-shaped frame, and means formed on said frame and engaging said shaft whereby to move the frame longitudinally simultaneously with the shaft.

In testimony whereof I affix my signature in presence of two witnesses.

WESLEY ELLIS.

Witnesses:
 IRA C. SHICK,
 ALVA SHICK.

---

Copies of this patent may be obtained for five cents each, by addressing the "Commissioner of Patents, Washington, D. C."